Patented Jan. 26, 1954

2,667,462

UNITED STATES PATENT OFFICE 2,667,462

ADHESIVE FROM MONOETHYLENICALLY UNSATURATED DICARBOXYLIC ACID SALT POLYMER

Myron F. Wildish, Terre Haute, Ind., and John Edward Hefferline, Issaquah, and Hugh F. Rippey, Auburn, Wash.; said Wildish assignor to Monsanto Chemical Company, St. Louis, Mo., a corporation of Delaware No Drawing. Application October 24, 1950, Serial No. 191,921

19 Claims. (Cl. 260—17.4)

This invention relates to the production of a new synthetic adhesive composition, particularly applicable to rewettable gummed tape, and to an improved rewettable gummed tape.

The term "rewettable gummed tape" is used to denote a paper or cloth sheet or strip, collectively referred to as "gumming stock," coated on one side with an adhesive capable of being readily rewet with water and which adhesive substantially immediately thereafter develops a sufficient tackiness to cause the tape to adhere to various surfaces to which it may be applied by the application of slight pressure. Obviously the same adhesive could be applied to envelopes, stamps, labels, wallpaper, etc. to be used in a similar manner. However, in the case of wallpaper it is generally preferable that the adhesive set up more slowly than in the other aforementioned applications, since it is necessary to be able to slide the wallpaper in order to effect perfect register of the pattern.

For many years the principal gumming adhesive used in the industry has been a composition of approximately 40 to 60 per cent of a relatively high grade animal glue and 60 to 40 per cent of a carbohydrate, preferably a dextrin. These adhesives in general have been relatively satisfactory, but the source of raw material, being of natural origin, is subject to fluctuation both in regard to quality and quantity available. Animal glue is primarily a by-product of the meat packing industry, and therefore the quantity available for commercial use may at times be very limited causing considerable competitive bidding for the available supply by the varied animal-glue-using industries such as gummed paper and tape, paper and paper products, gasket and cork products, textiles, containers, abrasives, adhesives, matches, calcimine, printer rollers, woodworking, bookbinding, luggage, rug and carpet, etc. For example, recently it was necessary for various gummed tape manufacturers to either curtail operations or actually temporarily shut down due to lack of animal glue. The novel adhesive of this disclosure may be readily adapted for use in many of the above industries alleviating their dependence on animal glue.

Animal glue-dextrin tapes are further not entirely suitable unless stored under optimum conditions of temperature and humidity. It has been stated that the maximum adhesive value of these tapes begins to decrease after a period of three months and most manufacturers recommend that the tape be used within a six-month period. Animal glue, being a protein, is also subject to micro-organism attack under various conditions which the rewettable gummed tape might encounter in normal field use with resultant inferior bonding of the affected tape. Animal glue-dextrin base rewettable gummed tape is also somewhat deficient in tolerance to rewetting with water. Too little water results in a starved glue line which possesses little or no resistance to shear stress. On the other hand, too much water results in flooding with resultant slip of the tape, if the bonded surfaces are under stress. Also the animal glue base tape must in general be applied within a period of 30 seconds from wetting in order to obtain a satisfactory bond. This requirement is often difficult to meet in shipping-room practice, especially when large containers are being sealed. There has thus long been a need for greater latitude of rewettable tapes to rewetting conditions and generally improved gumming adhesives.

The preferred requirements of a good rewettable gummed tape adhesive are that the adhesive must form a stable, easily rewettable, water tolerant, smooth, glossy, tasteless, odorless, flexible, non-toxic, and non-hygroscopic film when spread on gumming stock and subseuently dried. The adhesive to be spread on the gumming stock preferably should: (1) be free from excessive shrinkage upon drying producing a relatively flat, easily handled sheet; (2) be relatively neutral in pH to avoid weakening and discoloration of the gumming stock and corrosion to processing equipment; (3) be relatively free from foaming; (4) possess a spreadable viscosity at relatively high total solids content (say 30 to 40 per cent) to permit rapid drying without excessive penetration into the gumming stock; (5) provide good adhesion at adhesive spreads below about 18 pounds per ream; (6) be relatively stable to heat; (7) possess adequate liquid storage life without material chemical, physical, or microbiological change; (8) possess specific adhesion to various surfaces; (9) develop a firm non-slipping bond rapidly when applied with slight pressure (see ASTM Bulletin No. 98 p. 23–27: May 1939 and TAPPI T463m–46); and (10) possess a satisfactory wet exposure latitude after rewetting and prior to application, while maintaining satisfactory ultimate adhesion (The Gummed Products Co. permanent adhesion test).

It is an object of this invention to provide industry with an improved adhesive base which is not a by-product, thus assuring a direct adequate supply at all times. Another object is to provided an adhesive which increases in viscosity when heated, said viscosity increase being substantially reversible when the adhesive is cooled. Another object is to provide a rewettable gummed tape adhesive having relatively long shelf-life and having substantially complete resistance to micro-organism attack. Another object is to provide a rewettable gummed tape of improved latitude when rewet prior to application. Another object is to produce a rewettable gummed tape adhesive from a solubilized heteropolymer containing a substantial number of reactive radicals from the group consisting of carboxyl

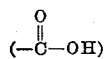

and anhydride

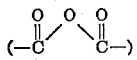

radicals, modified by the presence of from about 0.05 to about 0.6 mol and preferably from about 0.1 to about 0.3 mol of a non-toxic polyvalent metal cation-providing material per mol of heteropolymer unit. It is a still further object of this invention to produce rewettable gummed tape adhesive compositions in which the adhesive comprises a water-dispersible derivative of a styrene-maleic anhydride heteropolymer modified by the presence of from about 0.05 to about 0.6 mol and preferably from about 0.1 to about 0.3 mol of a calcium cation-providing material, per mol of heteropolymer unit, and various other modifiers, diluents or extenders. Further objects will be apparent to those skilled in the art from the following disclosure.

It has now been found that the modification of a styrene-maleic anhydride-type heteropolymer reacted with from about 0.05 to about 0.6 mol and preferably from about 0.1 to about 0.3 mol of a polyvalent metal cation-providing material, for example calcium hydroxide, calcium chloride, magnesium sulfate, magnesium lactate, aluminum sulfate, ferric citrate, ferrous sulfate, etc. and solubilized with the sum of from about 0.8 to about 2.25 and preferably from about 1.0 to about 2.0 mols of a solubilizer from the group consisting of alkali metal hydroxides, such as sodium hydroxide, potassium hydroxide, etc.; ammonium hydroxide; and mono-amines having a dissociation constant greater than $10^{-6}$, for example, ethylamine, secondary butylamine; dimethylamine, diethylamine, dipropylamine, diethylbenzylamine, etc.; all per mol of heteropolymer unit, provides a very excellent adhesive. The above use of "sum" is understood to mean the sum of the molequivalents of the solubilizers, as for example 0.5 mol of each of the hydroxides of sodium, potassium, and ammonium, provides 1.5 mols of solubilizer.

In general, however, the use of amines has been avoided due to their potential toxicity. It must be borne in mind that the novel adhesive disclosed herein is especially suitable as a rewettable adhesive and whereas a large percentage of gummed tape is dispensed by machine the hazard of wetting by tongue is ever-present and proper precautions must be taken. This is even more important in envelope seals, stamps, stickers, etc. which may be used by the general public without an artificial wetting device.

It is theorized that in order to have a high adhesion a non-Newtonian viscosity material is to be desired. This may be obtained by reacting styrene-maleic anhydride, or similar heteropolymers, as for example styrene-itaconic anhydride, vinyl acetate-maleic anhydride, styrene-vinyl acetate-maleic anhydride, etc. with a solubilizer and a polyvalent metal cation-providing material, as for example, magnesium, calcium, strontium, barium, aluminum, iron, cobalt, nickel, copper, zinc, cadmium, mercury, titanium, tin, lead, chromium, manganese, etc. cation-providing materials, in the proper quantity depending on the molecular weight and shape of the heteropolymer to cause the proper degree of cross-linking to resist flow and thereby produce quick stick. An excess of the polyvalent metal cation which would cause insolubilization of the heteropolymer should not be used. The non-toxic metal cations, for example calcium, magnesium, aluminum, iron, etc. are specifically preferred for the superior properties imparted to the adhesive.

It may readily be seen that the quantity of cross-linking agent must fall within relatively critical limits, but these limits will tend to vary for different agents and for different heteropolymers and even similar heteropolymers of varying molecular weight. This may be readily understood from the fact that long chain polymers require very little cross-linking agent to materially affect their flow properties, whereas short chain polymers in general require a higher proportion of cross-linking agent to cause a similar change in flow properties.

This adhesive base is particularly suitable for rewettable gummed tape since it appears to store indefinitely, resists micro-organism attack, and exhibits excellent and unexpectedly high quick stick, and permanent adhesion. This base adhesive may be modified by such additives as humectants, plasticizers, fluidifiers, diluents, fillers, and defoamers, as for example invert sugar, glucose, levulose, dextrin, sucrose, boiled starch, starch, vegetable gums, urea, glycerine, pine oil, tributyl phosphate, waste sulfite liquor or lignone sulfonate solids, etc.

The base adhesive may be used satisfactorily alone but is more economical and produces superior results when modified with components of the foregoing materials, invert sugar being especially satisfactory. In general therefore the novel adhesive of this disclosure may be modified by up to about 75 per cent of the aforementioned type material, based on the adhesive composition total solids.

Suitable heteropolymers containing a substantial number of reactive radicals from the group consisting of carboxyl

and anhydride

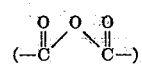

radicals, may be defined as heteropolymers of (A) polymerizable monovinyl compounds with (B) 4- to 6-carbon atom monoethylenic unsaturated dicarboxylic acids (as for example, maleic, fumaric, citraconic, mesaconic, and itaconic acids) and anhydrides. Partially esterified 4- to 6-carbon atom unsaturated dicarboxylic acids also may be employed as hereinafter more fully described. This class of heteropolymers is also sometimes referred to as "styrene-maleic anhydride heteropolymer-type" resins.

A substantial number of reactive radicals is understood to mean from one to two carboxyl radicals or one anhydride radical per heteropolymer unit.

The term "heteropolymer unit" is used to designate the smallest repeating structural unit of the heteropolymer, as for example the "heteropolymer unit" of styrene-maleic anhydride has a molecular weight of 202 and has the structure:

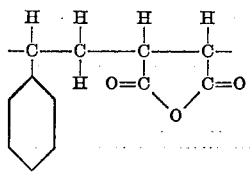

Generally speaking the styrene-maleic anhydride heteropolymer-type resins are prepared by the well-known methods of the prior art (U. S. Patent No. 2,047,398, etc.), as for example, solvent, solvent-non-solvent, and mass polymerization processes, however the benzene solvent-non-solvent process currently appears preferable. The mol ratios of the heteropolymer monomers are preferably substantially one, thus for example the styrene-maleic anhydride heteropolymer is prepared by the polymerization of one mol of styrene with one mol of maleic anhydride.

There are several reams used in the paper industry. The ream measurement used herein to calculate adhesive spread, weight of gumming stock and weight of test paper is 500 sheets of 24-inch by 36-inch paper. The adhesive spread is the pounds of dry adhesive, as determined by actual application conditions, coated on one ream of gumming stock. Since the applied adhesive may retain from about 5 to about 10 per cent moisture, the actual dry weight of the adhesive should be employed in cost calculations wherein spread is used as the basis of comparison.

Samples of animal glue-dextrin rewettable gummed tape were obtained from various sections of the country, evaluated, and the best tape chosen to represent the "standard" commercial animal glue-dextrin tape in the comparison tests. Therefore, it should be kept in mind that even where the novel tape of this invention may be only equivalent to the "standard" commercial tape it is still actually better than the average commercial animal glue-dextrin tapes currently available.

In the following tabulations of formulation compositions the term "Percent Dry Basis" indicates a calculated composition by weight based on the exclusion of water. The actual oven determination of total solids, for example 4 hours at 105° C., may result in a slightly lower value due to small amounts of volatile ingredients present in the formulation. Also the term "SMA" is used to designate the styrene-maleic anhydride heteropolymer base adhesive. The pH values in the following examples were determined with standardized glass electrode Coleman or McBeth pH meters.

Having briefly disclosed the novel styrene-maleic anhydride heteropolymer-type adhesive base the following examples are illustrative of the invention.

*Example 1*

A superior rewettable adhesive was prepared by dissolving 90.6 grams of calcium chloride in 2400 grams of water and adding thereto 18 grams of pine oil. Then 660 grams of solvent-non-solvent (benzene) process styrene-maleic anhyride was slurried into the mixture and a solution of 234.5 grams of sodium hydroxide dissolved in 1545 grams of water was added slowly with stirring to obtain a viscous dispersion. To the dispersion was then added with stirring 1907 grams of a 77.5 per cent invert sugar ("Sucrolene") solution and the stirring continued until the dispersion was homogeneous. Preferably a counter-rotating blade type mixer should be employed to aid rapid dispersion.

The non-water fraction of the formulation was calculated to have the following composition:

|  | Percent Dry Basis | Mol Ratio |
| --- | --- | --- |
| Calcium chloride | 3.7 | 0.25 |
| Pine oil | 0.7 |  |
| Styrene-maleic anhydride | 26.6 | 1.00 |
| Sodium hydroxide | 9.5 | 1.79 |
| Invert sugar | 59.5 |  |
|  | 100.0 |  |

The formulation as prepared had a pH of 8.6, 36 per cent total solids, and a viscosity of about 6400 centipoise at 77° F., 8400 centipoise at 120° F., and 34,000 centipoise at 138° F. This unusual temperature-viscosity effect is substantially reversible and is advantageous in the application of the adhesive to gumming stock in that the more viscous formulation is more easily retained on the paper surface (there being little overpenetration loss) during drying and is thereby substantially 100 per cent available when the adhesive coated tape is rewet for use. Another similar formulation, the base adhesive for which was a composition having a mol ratio of 0.21 Ca:1.5 NaOH:1.0 SMA, had a viscosity of about 13,600 centipoise at 70° F., 12,400 centipoise at 100° F., 70,000 centipoise at 140° F., and greater than 200,000 centipoise at 170° F. In general it was found that a base adhesive composition of 0.21 Ca:1.25 NaOH:1.0 SMA showed the unusual temperature-viscosity effect but compositions of 0.21 Ca:1.5 NaOH:1.0 SMA and 0.25 Ca:1.8 NaOH:1.0 SMA showed a much more marked effect.

The above adhesive was spread onto 70 lb. kraft and 60 lb. supercalendered kraft gumming stock by roll application in an experimental pilot plant gummer. The travel was 10 feet per minute, roll applicator nip spacing ranged from about 0.0075 to about 0.0095 inch to vary the weight of adhesive spread (about 13 to 16 lbs. SMA per ream), glue pan temperature ranged from about 80 to 85° F., and the drying temperature of the three-stage drier ranged from about 110 to 240° F. the preferred temperatures for this rate of travel being 240° F. in the first stage, 220° F. in the second, and 180° F. in the third.

*Example 2*

An adhesive was prepared as follows:

A

To 260 grams of water 517 grams of dextrin (Corn Products Co. No. 152) was slowly added with stirring, over a 10 minute period. The high-speed stirrer was allowed to agitate the ingredients for about an additional 10 minutes to a substantially homogeneous appearance, then 323 grams of urea was added with stirring for about 50 minutes. The solution was thinned with 100 grams of water.

B

Seventy grams of calcium chloride was dissolved in 2164 grams of water, 8 grams of pine oil added and 612 grams of minus 20-mesh styrene-maleic anhydride was slurried therein until smooth. Then a solution of 151 grams of sodium hydroxide in 1298 grams of water was slowly added under heavy agitation. The heteropolymer mass was then kept warm (125° F.) overnight in a sealed container to obtain a homogeneous dispersion, then cooled, and 178 grams of ammonium hydroxide (28% NH₃) slowly added with stirring.

C

To 3550 grams of dispersion B was added 950 grams of solution A and the formulation was stirred to homogeneity. The formulation pH was 9.1, total solids were approximately 30 per cent, and the viscosity at 140° F. was found to be about 3000 centipoise as determined with a Brookfield viscosimeter.

The formulation was calculated to contain the following composition:

|  | Percent Dry Basis | Mol Ratio |
|---|---|---|
| Dextrin | 29.8 | |
| Urea | 18.7 | |
| Calcium chloride | 4.0 | 0.21 |
| Pine oil | 0.5 | |
| Styrene-maleic anhydride | 35.4 | 1.00 |
| Sodium hydroxide | 8.7 | 1.28 |
| Ammonia | 2.9 | 0.97 |
| | 100.0 | |

This adhesive was applied to standard 60 lb. kraft gumming stock with the doctor bar experimental gummer operating at about 12 feet per minute, having a glue pan temperature of about 75° F. and a drying temperature of about 300° F. for 30 seconds. The spread was found to be about 16 lbs. SMA per ream.

*Example 3*

An adhesive was prepared as follows:

A

To 347 grams of water 690 grams of dextrin (Corn Products Co. No. 152) was slowly added with stirring, over a 10 minute period. The high-speed stirrer was allowed to agitate the ingredients for about an additional 10 minutes to a substantially homogeneous appearance, then 431 grams of urea was added with stirring for about 50 minutes. The solution was thinned with 133 grams of water.

B

Calcium chloride, in the amount of 93.3 grams, was dissolved in 2885 grams of water, 10.7 grams of pine oil added and 816 grams of minus 20-mesh styrene-maleic anhydride was slurried therein until smooth. Then a solution of 151 grams of sodium hydroxide in 1298 grams of water was slowly added under heavy agitation. The heteropolymer mass was then kept warm (125° F.) overnight in a sealed container to obtain a homogeneous dispersion, then cooled, and 237 grams of ammonium hydroxide (28% NH₃) slowly added with stirring.

C

To 4730 grams of dispersion B were added 1266 grams of solution A and the formulation was stirred to homogeneity. The formulation pH was 9.0, total solids were approximately 30 per cent, and the viscosity at 140° F. was found to be about 3000 centipoise as determined with a Brookfield viscosimeter.

The formulation was calculated to contain the following composition:

|  | Percent Dry Basis | Mol Ratio |
|---|---|---|
| Dextrin | 29.2 | |
| Urea | 18.3 | |
| Calcium chloride | 4.3 | 0.21 |
| Pine oil | 0.5 | |
| Styrene-maleic anhydride | 37.7 | 1.00 |
| Sodium hydroxide | 7.0 | 0.94 |
| Ammonia | 3.0 | 0.96 |
| | 100.0 | |

The above adhesive was applied to 60 lb. supercalendered kraft gumming stock with the roll applicator experimental gummer set at a nip spacing of about 0.005 inch and operating at about 19 feet per minute, having a glue pan temperature of about 90 to 95° F. and a drying temperature of about 200 to 205° F. The spread was found to be 11.5 SMA per ream.

The above formulation was found to be stable, as a liquid adhesive, even at 180° F. for 15 hours showing no appreciable viscosity change during this time and when the heat-treated adhesive was spread on gumming stock and tested, no significant change of adhesion was found. The spread tape was tolerant to under and over drying, and a 240 to 300° F. drying temperature without loss of adhesion values. This adhesive was not spread at higher drying temperatures than indicated but a higher drying temperature for a shorter time preferably such that the resultant gummed tape contains from about 5 to about 10 per cent moisture, would produce a satisfactory tape.

*Example 4*

An adhesive was prepared as follows:

A

To 828 grams of dextrin was slowly added 337 grams of water with heavy agitation which was continued until the mix was smooth, then 517 grams of urea was added with continuing agitation until smooth. The pasty dispersion was then thinned with 239 grams of water to yield a viscous solution of dextrin and urea containing 70 per cent total solids.

B

Calcium chloride, in the amount of 17.4 grams, was dissolved in 1063 grams of water and 56 grams of sodium hydroxide added thereto forming a precipitate of calcium hydroxide. Then 226.6 grams of solvent-non-solvent process, wherein the solvent was benzene, styrene-maleic anhydride was slurried into the mixture and agitated at 180° F., until the dispersion appeared uniform, then the dispersion, contained in a sealed vessel, was placed in an oven held at 230° F. for about 0.5 hour. A total of 5 grams of pine oil was added and the viscous dispersion centrifuged to aid the removal of entrapped air yielding a clear dispersion or solution.

C

To 1280 grams of dispersion B was added 403 grams of solution A with mild agitation to avoid entrapment of air, until the formulation appeared homogeneous. The formulation pH was 6.9, total solids were approximately 33 per cent, and the viscosity at 140° F. was found to be about 7000 centipoise as determined with a Brookfield viscosimeter.

The formulation composition was calculated as follows:

|  | Percent Dry Basis | Mol Ratio |
| --- | --- | --- |
| Calcium chloride | 2.9 | 0.14 |
| Sodium hydroxide | 9.3 | 1.25 |
| Styrene-maleic anhydride | 37.4 | 1.00 |
| Pine Oil | 0.8 | |
| Dextrin | 30.6 | |
| Urea | 19.0 | |
|  | 100.0 | |

This adhesive was applied to standard 60 lb. kraft gumming stock with the doctor bar experimental gummer set at 0.005 inch and operating similarly to Example 2. The spread was found to be 16.5 lbs. SMA per ream.

The gummed tape was held at 125° F. for two weeks without substantial loss of properties, indicating good stability at normal shelf condition storage.

*Example 5*

To 1500 grams of water was added 28 grams of calcium oxide and agitated with a high-speed mixer until the slaked lime appeared smooth, then 402 grams of styrene-maleic anhydride was added and mixing continued until the slurry was uniform. To the suspension was added 103 grams of sodium hydroxide dissolved in 900 grams of water and stirring continued for 10 minutes. The dispersion was then aged overnight in a sealed container at 125° F. To the cooled dispersion was added 918 grams of invert sugar ("Sucrolene") solution containing 77.5 per cent solids and about 10 grams of pine oil, with constant stirring until the formulation was homogeneous.

The formulation pH was 8.9, the total solids were approximately 35 per cent and the viscosity was about 3200 centipoise at 77° F. as determined with a MacMichael viscosimeter.

The formulation composition was calculated as follows:

|  | Percent Dry Basis | Mol Ratio |
| --- | --- | --- |
| Calcium | 1.9 | 0.25 |
| Styrene-maleic anhydride | 28.0 | 1.00 |
| Sodium hydroxide | 7.2 | 1.29 |
| Invert sugar | 62.0 | |
| Pine oil | 0.9 | |
|  | 100.0 | |

This adhesive was applied to 60 lb. kraft gumming stock with the doctor bar experimental gummer similarly to Example 2. The spread was found to be 15.2 lbs. SMA per ream.

*Example 6*

Fifty grams of styrene-maleic anhydride was slurried into a solution of 341 grams of water and 10.2 grams of 97.5 per cent sodium hydroxide. The rate of dispersion was aided by warming to about 170° F. When the dispersion appeared homogeneous, 15.2 grams of precipitated chalk was added with stirring. The formulation pH was 5.4 and the total solids were about 18 per cent.

The formulation composition was calculated to be:

|  | Percent Dry Basis | Mol Ratio |
| --- | --- | --- |
| Styrene-maleic anhydride | 66.7 | 1.0 |
| Sodium hydroxide | 13.3 | 1.0 |
| Calcium carbonate | 20.0 | 0.6 |
|  | 100.0 | |

The above adhesive was spread at a doctor bar setting of 0.006 inch to give 15.5 lbs. SMA per ream. The coated adhesive was somewhat brittle and lacked a good glossy appearance but gave satisfactory results as a rewettable adhesive. The above adhesive may be improved by adding waste sulfite liquor or lignone sulfonate solids, invert sugar, urea, dextrin, etc. singly or in combination.

The stability of this higher mol ratio of calcium is somewhat inferior to lower mol ratios, but similar formulations have merit as a permanent labeling adhesive which develops resistance to water with aging.

*Example 7*

To 354 grams of water was added 16.9 grams of calcium chloride, 3.2 grams of pine oil, and 110 grams of styrene-maleic anhydride were slurried therein with a high-speed stirrer until smooth. A solution of 32.6 grams of sodium hydroxide dissolved in 284 grams of water was added slowly with heavy agitation until the mixture began to thicken appreciably, at which time the balance of the caustic solution was dumped into the mixture and agitation continued until the dispersion appeared uniform. The dispersion was aged overnight at 125° F. in a sealed container, after which time the formulation was a gel. To the gel were added 468 grams of an 80 per cent glucose solution and 217 grams of water with stirring. The gel was not completely broken down after a short mixing period, so 11.6 grams of sodium hydroxide dissolved in 334 grams of water were added. Further mixing resulted in a homogeneous dispersion which was clear and very fluid. The formulation pH was 10.0, total solids were approximately 30 per cent, and the viscosity at 77° F. was 460 centipoise.

The formulation composition was calculated to be:

|  | Percent Dry Basis | Mol Ratio |
| --- | --- | --- |
| Calcium chloride | 3.1 | 0.28 |
| Pine oil | 0.6 | |
| Styrene-maleic anhydride | 20.1 | 1.0 |
| Sodium hydroxide | 8.0 | 2.0 |
| Glucose | 68.2 | |
|  | 100.0 | |

The adhesive formulation was spread with a doctor bar setting of 0.0035 inch to give 17 lbs. SMA per ream.

*Example 8*

To 2000 grams of water was added 58 grams of calcium chloride, 6.25 grams of pine oil, and 503 grams of styrene-maleic anhydride were slurried therein until smooth. A solution of 124 grams of sodium hydroxide dissolved in 737 grams of water was added with stirring, then the dispersion was aged overnight at 125° F., cooled, and 94 grams of ammonium hydroxide (28%

NH₃) added with stirring to homogeneity. The pH of this formulation was 9.3.

One hundred grams of animal glue was dissolved in 136 grams of water and mixed into 500 grams of the above SMA base dispersion with stirring.

To 645 grams of the animal glue-SMA base dispersion were added 252 grams of a 70 per cent urea-dextrin solution (68 grams urea and 109 grams of dextrin) and 212 grams of water. The formulation was well agitated to homogeneity. The formulation pH was 8.7 and the total solids were about 32 per cent.

The formulation composition was calculated as follows:

|  | Percent Dry Basis | Mol Ratio |
|---|---|---|
| Calcium chloride | 2.0 | 0.21 |
| Styrene-maleic anhydride | 17.9 | 1.00 |
| Pine oil | 0.2 | |
| Sodium hydroxide | 4.4 | 1.25 |
| Ammonia | 0.9 | 0.62 |
| Animal glue | 24.8 | |
| Urea | 19.1 | |
| Dextrin | 30.7 | |
| | 100.0 | |

When spread at a doctor bar setting of 0.0035 inch similarly to Example 2 the tape contained 13.5 lbs. SMA per ream.

Example 9

A dispersion was prepared by adding 67 grams of a 20 per cent half-methyl ester of styrene-maleic anhydride prepared by the mass process to 380 grams of water having previously added thereto 4.5 grams of calcium chloride, 23.8 grams of sodium hydroxide, and 1.8 grams of pine oil. The mixture was well agitated to a uniform appearance and the dispersion aged overnight at 125° F., cooled and 185 grams of a 77.5 per cent invert sugar solution stirred in, yielding a very fluid adhesive dispersion of pH 8.9 and approximately 36 per cent total solids.

The formulation composition was calculated as follows:

|  | Percent Dry Basis | Mol Ratio |
|---|---|---|
| Calcium chloride | 1.9 | 0.13 |
| Sodium hydroxide | 9.9 | 1.85 |
| Pine oil | 0.7 | |
| Styrene-maleic anhydride ester | 27.9 | 1.00 |
| Invert sugar | 59.6 | |
| | 100.0 | |

The adhesive was spread similarly to Example 2 by the doctor bar experimental gummer.

Other partial esters may be employed, as for example: ethyl; normal- and iso-propyl; normal-, iso-, secondary- and tertiary-butyl. The esterification may range from zero to substantially the half ester of the anhydride or dicarboxylic acid monomer. It appears that the butyl esters exhibit optimum rewettable adhesive properties. There is an increasing difficulty to rewetting as the ester group increases in size, thus the ester group should be limited to not more than four carbon atoms where the adhesive is intended for a rewettable application as in gummed tape, stamps, stickers, envelopes, etc. but may be larger where this property is not controlling or necessarily desirable.

Example 10

Additional formulations were prepared and evaluated. The pertinent data are listed below:

| Tape | SMA 1 | SMA 2 | SMA 3 | SMA 4 |
|---|---|---|---|---|
| Mol Ratio: | | | | |
| SMA | 1.0 | 1.0 | 1.0 | 1.0 |
| CaCl₂ | 0.21 | 0.21 | 0.21 | 0.21 |
| NaOH | 1.5 | 1.25 | 1.25 | 1.25 |
| NH₃ | | | 0.43 | 0.62 |
| Composition, Percent Dry Basis: | | | | |
| CaCl₂ | 4.1 | 4.2 | 4.2 | 4.1 |
| NaOH | 10.5 | 9.0 | 8.9 | 8.9 |
| NH₃ | | | 1.3 | 1.9 |
| SMA | 35.4 | 36.6 | 36.1 | 36.1 |
| Dextrin | 30.8 | 30.7 | 30.3 | |
| Urea | 19.2 | 19.2 | 18.9 | |
| Invert sugar | | | | 48.6 |
| Pine oil | | 0.3 | 0.3 | 0.4 |
| Total | 100.0 | 100.0 | 100.0 | 100.0 |
| Formulation: | | | | |
| pH | 7.5 | 6.5 | 8.1 | 8.7 |
| Percent TS | 31 | 26 | 30 | 31 |

All the foregoing rewettable gummed tapes of Examples 1 through 10 were tested and found to be far superior or equivalent to the standard tape by all methods of comparison.

The dry adhesive spread may vary over a considerable range, but from about 10 to about 18 pounds per ream appears preferable. Also, the drying conditions may be widely varied; time, temperature, relative humidity, etc. being correlated to produce a tape of substantially optimum equilibrium moisture conditions as is well-known in the art. Thus, for example commercial drying temperatures of about 500° F. may be employed for about 20 to 30 seconds to produce a gummed tape. In general, it is preferable to effect rapid drying both to maintain a high production rate and produce a superior gummed tape.

Whereas satisfactory adhesives may be made by various formulation procedures, it is preferable to slurry the synthetic heteropolymer with the polyvalent metal cation-providing material and then add thereto the heteropolymer solubilizer material with subsequent addition of the modifiers, as for example invert sugar, dextrin and urea, etc. or the synthetic heteropolymer may be slurried into a solution or suspension of the solubilizer and polyvalent metal cation-providing material. The above procedures prevent potential local formation, due to high local concentrations of the polyvalent metal cation, of relatively insoluble or slowly dispersible heteropolymer salts, which may result if the heteropolymer is first solubilized and then introduced to the polyvalent metal cation or vice versa.

The novel adhesive of this disclosure has good specific adhesion for various surfaces, for example paper, wood, glass, metal, plaster, painted surfaces, etc. The adhesive may also be used to laminate paper, wood, veneer, etc. where the product will not be subjected to adverse weather conditions. In general where such adverse applications are contemplated a high percentage of the solubilizer should be of a volatile nature in order to increase the ultimate water resistance. Also higher mol ratios of the polyvalent metal providing material are indicated for this purpose, preferably having a relatively low solubility product to enable proper bonding without premature gelling.

While various specific examples of compositions and processes embodying the present invention have been described above, it will be apparent to those skilled in the art that many changes and modifications may be made in the methods of procedure, and that a wide variety of specific adhesive formulations may be employed. Therefore, it should be understood that the examples cited and the particular proportions and methods of procedure set forth are intended to be illustrative only, and are not intended to limit the scope of the invention.

We claim:

1. An adhesive composition comprising a synthetic heteropolymer, polymerized from a mixture consisting of (A) monomers of polymerizable monovinyl compounds, wherein the monovinyl group contains the sole polymerizable unsaturated group of the molecule, and the monomer is free from other reactive groups, and (B) 4-to-6 carbon atom monoethylenic unsaturated dicarboxylic acids, selected from the group consisting of maleic acid, fumaric acid, citraconic acid, mesaconic acid and itaconic acid, anhydrides, and partial alkyl esters thereof, containing a substantial number of reactive radicals from the group consisting of

and

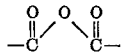

wherein the heteropolymer contains substantially equimolecular amounts of the monomers (A) and (B) reacted with the sum of about 0.8 to about 2.25 mols of a solubilizer from the group consisting of alkali metal hydroxides, ammonium hydroxide and monoamines of greater dissociation constant than $10^{-6}$, and from about 0.05 to about 0.6 mol of a polyvalent metal cation-providing material selected from the group of non-toxic cations consisting of calcium, magnesium, aluminum, and iron, all per mol of heteropolymer unit, said adhesive composition being characterized by water-dispersibility.

2. A rewettable gummed tape coated with an adhesive composition comprising a synthetic heteropolymer, polymerized from a mixture consisting of (A) monomers of polymerizable monovinyl compounds, wherein the monovinyl group contains the sole polymerizable unsaturated group of the molecule, and the monomer is free from other reactive groups, and (B) 4- to 6-carbon atom monoethylenic unsaturated dicarboxylic acids selected from the group consisting of maleic acid, fumaric acid, citraconic acid, mesaconic acid and itaconic acid, anhydrides, and partial alkyl esters thereof wherein the said alkyl radical contains up to 4 carbon atoms, containing a substantial number of reactive radicals from the group consisting of

and

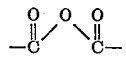

wherein the heteropolymer contains substantially equimolecular amounts of the monomers (A) and (B); reacted with the sum of about 0.8 to about 2.25 mols of a solubilizer from the group consisting of alkali metal hydroxides, ammonium hydroxide and monoamines of greater dissociation constant than $10^{-6}$, and from about 0.05 to about 0.6 mol of a polyvalent metal cation-providing material selected from the group of non-toxic cations consisting of calcium, magnesium, aluminum, and iron, all per mole of heteropolymer unit, said adhesive composition being characterized by water-dispersibility.

3. An adhesive composition comprising a synthetic heteropolymer, polymerized from a mixture consisting of (A) monomers of polymerizable monovinyl compounds, wherein the monovinyl group contains the sole polymerizable unsaturated group of the molecule, and the monomer is free from other reactive groups, and (B) 4- to 6-carbon atom monoethylenic unsaturated dicarboxylic acids, selected from the group consisting of maleic acid, fumaric acid, citraconic acid, mesaconic acid and itaconic acid, anhydrides, and partial alkyl esters thereof, containing a substantial number of reactive radicals from the group consisting of

and

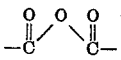

wherein the heteropolymer contains substantially equimolecular amounts of the monomers (A) and (B); reacted with the sum of about 0.8 to about 2.25 mols of a solubilizer from the group consisting of alkali metal hydroxides, ammonium hydroxide and monoamines of greater dissociation constant than $10^{-6}$, and from about 0.1 to about 0.3 mol of a polyvalent metal cation-providing material selected from the group of non-toxic cations consisting of calcium, magnesium, aluminum, and iron, all per mol of heteropolymer unit, said adhesive composition being characterized by water-dispersibility.

4. An adhesive composition comprising the copolymer styrene-maleic anhydride, wherein the copolymer is prepared from a mixture, the reactive polymerizable components of which consist of styrene and maleic anhydride monomers, and the said copolymer contains substantially equimolecular amounts of the said monomers, reacted with the sum of about 0.8 to about 2.25 mols of a solubilizer from the group consisting of alkali metal hydroxides, ammonium hydroxide and monoamines of greater dissociation constant than $10^{-6}$, and from about 0.05 to about 0.6 mol of a polyvalent metal cation-providing material selected from the group of non-toxic cations consisting of calcium, magnesium, aluminum, and iron, all per mol of styrene-maleic anhydride heteropolymer unit, said adhesive composition being characterized by water-dispersibility.

5. The adhesive composition of claim 4, wherein the polyvalent metal cation is calcium.

6. An adhesive composition comprising the copolymer styrene-maleic anhydride, wherein the copolymer is prepared from a mixture, the reactive polymerizable components of which consist of styrene and maleic anhydride monomers, and the said copolymer contains substantially equimolecular amounts of the said monomers, reacted with the sum of about 0.8 to about 2.25 mols of a solubilizer from the group consisting of alkali metal hydroxides, ammonium hydroxide and monoamines of greater dissociation constant than $10^{-6}$, and from about 0.1 to about 0.3 mol of a polyvalent metal cation-providing material selected from the group of non-toxic cations consisting of calcium, magnesium, aluminum, and iron, all per mol of styrene-maleic anhydride heteropolymer unit, said adhesive composition being characterized by water-dispersibility.

7. The adhesive composition of claim 6, wherein the polyvalent metal cation is calcium.

8. A rewettable gummed tape coated with the adhesive of claim 7.

9. An adhesive composition comprising the reaction product of the copolymer styrene-maleic anhydride, wherein the copolymer is prepared from a mixture, the reactive polymerizable components of which consist of styrene and maleic anhydride monomers, and the said copolymer contains substantially equimolecular amounts of the said monomers, with the sum of about 0.8 to about 2.25 mols of solubilizer from the group consisting of from about 0.8 to about 2.0 mols of sodium hydroxide and up to about 1.0 mol ammonium hydroxide; and about 0.1 to about 0.3 mol of calcium cation-providing material, per mol of styrene-maleic anhydride heteropolymer unit, said adhesive composition being characterized by water-dispersibility.

10. A rewettable gummed tape coated with the adhesive of claim 9.

11. An adhesive composition comprising a synthetic heteropolymer, polymerized from a mixture consisting of (A) monomers of polymerizable monovinyl compounds wherein the monovinyl group contains the sole polymerizable unsaturated group of the molecule, and the monomer is free from other reactive groups, and (B) 4- to 6-carbon atom monoethylenic unsaturated dicarboxylic acids, selected from the group consisting of maleic acid, fumaric acid, citraconic acid, mesaconic acid and itaconic acid, anhydrides, and partial alkyl esters thereof, containing a substantial number of reactive radicals from the group consisting of

and

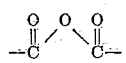

wherein the heteropolymer contains substantially equimolecular amounts of the monomers (A) and (B); reacted with the sum of about 0.8 to about 2.25 mols of a solubilizer from the group consisting of alkali metal hydroxides, ammonium hydroxide and monoamines of greater dissociation constant than $10^{-6}$, and from about 0.1 to about 0.3 mol of a polyvalent metal cation-providing material selected from the group of non-toxic cations consisting of calcium, magnesium, aluminum, and iron, all per mol of heteropolymer unit, and formulated with up to about 70 per cent modifiers from the group of carbohydrates consisting of invert sugar, glucose, levulose, dextrin, sucrose, boiled starch, starch, and vegetable gum, and up to about 20 per cent of urea, based on the formulation solids content, said adhesive composition being characterized by water-dispersibility.

12. An adhesive composition comprising the copolymer styrene-maleic anhydride, wherein the copolymer is prepared from a mixture, the reactive polymerizable components of which consist of styrene and maleic anhydride monomers, and the said copolymer contains substantially equimolecular amounts of the said monomers, reacted with the sum of about 0.8 to about 2.25 mols of a solubilizer from the group consisting of alkali metal hydroxides, ammonium hydroxide and monoamines of greater dissociation constant than $10^{-6}$ and from about 0.05 to about 0.6 mol of a calcium cation-providing material, all per mol of styrene-maleic anhydride heteropolymer unit, and formulated with up to about 70 per cent modifiers from the group of carbohydrates consisting of invert sugar, glucose, levulose, dextrin, sucrose, boiled starch, starch, and vegetable gum, and up to about 20 per cent of urea, based on the formulation solids content, said adhesive composition being characterized by water-dispersibility.

13. The adhesive composition of claim 12, wherein the modifier is invert sugar.

14. The adhesive composition of claim 12, wherein the modifier is dextrin.

15. An adhesive composition comprising the copolymer styrene-maleic anhydride, wherein the copolymer is prepared from a mixture, the reactive polymerizable components of which consist of styrene and maleic anhydride monomers, and the said copolymer contains substantially equimolecular amounts of the said monomers, reacted with the sum of about 0.8 to about 2.25 mols of a solubilizer from the group consisting of alkali metal hydroxides, ammonium hydroxide and monoamines of greater dissociation constant than $10^{-6}$, and from about 0.1 to about 0.3 mol of a calcium cation-providing material, all per mol of styrene-maleic anhydride heteropolymer unit, and formulated with up to about 70 per cent modifiers from the group of carbohydrates consisting of invert sugar, glucose, levulose, dextrin, sucrose, boiled starch, starch, and vegetable gum, and up to about 20 per cent of urea, based on the formulation solids content, said adhesive composition being characterized by water-dispersibility.

16. The adhesive composition of claim 15, wherein the modifier is invert sugar.

17. The adhesive composition of claim 15, wherein the modifier is dextrin.

18. A rewettable gummed tape coated with the adhesive of claim 15.

19. The process which comprises coating gumming stock with a film of a rewettable adhesive composition comprising a synthetic heteropolymer, polymerized from a mixture consisting of (A) monomers of polymerizable monovinyl compounds, wherein the monovinyl group contains the sole polymerizable unsaturated group of the molecule, and the monomer is free from other reactive groups, and (B) 4- to 6-carbon atom monoethylenic unsaturated dicarboxylic acids, selected from the group consisting of maleic acid, fumaric acid, citraconic acid, mesaconic acid and itaconic acid, anhydrides, and partial alkyl esters thereof, wherein the said alkyl radical contains up to 4 carbon atoms, containing a substantial number of reactive radicals from the group consisting of

and

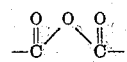

wherein the heteropolymer contains substantially equimolecular amounts of the monomers (A) and (B); reacted with the sum of about 0.8 to about 2.25 mols of a solubilizer from the group consisting of alkali metal hydroxides, ammonium hydroxide and monoamines of greater dissociation constant than $10^{-6}$, and from about 0.1 to about 0.3 mol of a polyvalent metal cation-providing material selected from the group of non-toxic cations consisting of calcium, magnesium, aluminum, and iron, all per mol of heteropolymer unit, and formulated with up to about 70 per cent modifiers from the group of carbohydrates consisting of invert sugar, glucose, levulose, dextrin, sucrose, boiled starch, starch, and vegetable gum, and up to about 20 per cent of urea, based on the formulation solids content, dispersed in water, and drying said film to substantially equilibrium moisture conditions.

MYRON F. WILDISH.
  JOHN EDWARD HEFFERLINE.
  HUGH F. RIPPEY.

References Cited in the file of this patent

UNITED STATES PATENTS

| Number | Name | Date |
|---|---|---|
| 2,045,080 | Hagedorn | June 23, 1936 |
| 2,334,358 | Smith | Nov. 16, 1943 |
| 2,409,861 | Hunter | Oct. 22, 1946 |
| 2,471,818 | Hunter | May 31, 1949 |

FOREIGN PATENTS

| Number | Country | Date |
|---|---|---|
| 970,321 | France | June 14, 1950 |